United States Patent
Klein et al.

(10) Patent No.: US 10,576,578 B2
(45) Date of Patent: Mar. 3, 2020

(54) METHOD OF MANUFACTURING A LEADING EDGE SHIELD

(71) Applicant: SAFRAN AIRCRAFT ENGINES, Paris (FR)

(72) Inventors: Gilles Charles Casimir Klein, Moissy-Cramayel (FR); Jean-Michel Patrick Maurice Franchet, Moissy-Cramayel (FR); Dominique Michel Serge Magnaudeix, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 326 days.

(21) Appl. No.: 15/512,140

(22) PCT Filed: Sep. 18, 2015

(86) PCT No.: PCT/FR2015/052507
§ 371 (c)(1),
(2) Date: Mar. 17, 2017

(87) PCT Pub. No.: WO2016/042275
PCT Pub. Date: Mar. 24, 2016

(65) Prior Publication Data
US 2017/0274470 A1    Sep. 28, 2017

(30) Foreign Application Priority Data

Sep. 19, 2014 (FR) .................................... 14 58855

(51) Int. Cl.
*B23K 20/02* (2006.01)
*F04D 29/32* (2006.01)
(Continued)

(52) U.S. Cl.
CPC ............ *B23K 20/021* (2013.01); *B23P 15/04* (2013.01); *F01D 5/147* (2013.01); *F01D 5/282* (2013.01);
(Continued)

(58) Field of Classification Search
CPC ....... B23K 20/021; B23P 15/04; F01D 5/147; F01D 5/282; B21D 53/78; F05D 2230/42
See application file for complete search history.

(56) References Cited

U.S. PATENT DOCUMENTS

| 4,010,530 A | 3/1977 | Delgrosso et al. |
| 5,169,288 A | 12/1992 | Gliebe et al. |

(Continued)

FOREIGN PATENT DOCUMENTS

| CN | 103562556 A | 2/2014 |
| FR | 2 319 008 A1 | 2/1977 |

(Continued)

OTHER PUBLICATIONS

International Search Report dated Dec. 17, 2015 in PCT/FR2015/052507 filed Sep. 18, 2015.

(Continued)

*Primary Examiner* — Igor Kershteyn
*Assistant Examiner* — Brian O Peters
(74) *Attorney, Agent, or Firm* — Oblon, McClelland, Maier & Neustadt, L.L.P.

(57) ABSTRACT

A field of rotary blades, and more particularly to a method of fabricating a leading edge shield for protecting such a blade. The method includes at least steps of performing initial plastic deformation on at least one sheet from a pressure side sheet and a suction side sheet, using additive fabrication to add a reinforcement with a fiber insert on at least one of the pressure and suction side sheets, closing the pressure and suction side sheets around a core after the (Continued)

initial plastic deformation and after adding the reinforcement, performing subsequent plastic deformation by pressing the pressure and suction side sheets against an outside surface of the core after the sheets have been closed around the core, and extracting the core.

16 Claims, 3 Drawing Sheets

(51) Int. Cl.
| | | |
|---|---|---|
| *F01D 5/28* | (2006.01) | |
| *F04D 29/02* | (2006.01) | |
| *B23P 15/04* | (2006.01) | |
| *F01D 5/14* | (2006.01) | |
| *B23K 101/00* | (2006.01) | |
| *B21D 53/78* | (2006.01) | |

(52) U.S. Cl.
CPC ......... *F04D 29/023* (2013.01); *F04D 29/324* (2013.01); *B21D 53/78* (2013.01); *B23K 2101/001* (2018.08); *F05D 2220/36* (2013.01); *F05D 2230/233* (2013.01); *F05D 2230/25* (2013.01); *F05D 2230/42* (2013.01); *F05D 2240/303* (2013.01); *F05D 2300/133* (2013.01); *F05D 2300/603* (2013.01)

(56) References Cited

U.S. PATENT DOCUMENTS

| | | | |
|---|---|---|---|
| 8,782,887 B2* | 7/2014 | Franchet | B21D 53/78 |
| | | | 29/889.71 |
| 9,598,966 B2* | 3/2017 | Klein | F01D 5/282 |
| 2008/0181766 A1 | 7/2008 | Campbell et al. | |
| 2010/0242843 A1* | 9/2010 | Peretti | B22F 5/04 |
| | | | 118/723 E |
| 2012/0114494 A1 | 5/2012 | Ford et al. | |
| 2014/0086753 A1 | 3/2014 | Klein et al. | |
| 2015/0104323 A1 | 4/2015 | Franchet et al. | |

FOREIGN PATENT DOCUMENTS

| | | |
|---|---|---|
| FR | 2 975 734 A1 | 11/2012 |
| SU | 1278469 A1 | 12/1986 |
| SU | 1483049 A1 | 5/1989 |
| WO | 2013/156711 A1 | 10/2013 |

OTHER PUBLICATIONS

English translation of Chinese Office Action dated Sep. 28, 2018 in Patent Application No. 2015800505441, 9 pages.
Combined Russian Office Action and Search Report dated May 21, 2019 in Patent Application No. 2017113363/02, 6 pages (submitting English translation of Office Action only and Translation of Category of Cited Documents).
Chinese Office Action issued in Chinese Patent Application No. 2015800505441 dated Sep. 27, 2019, (English Translation).

\* cited by examiner

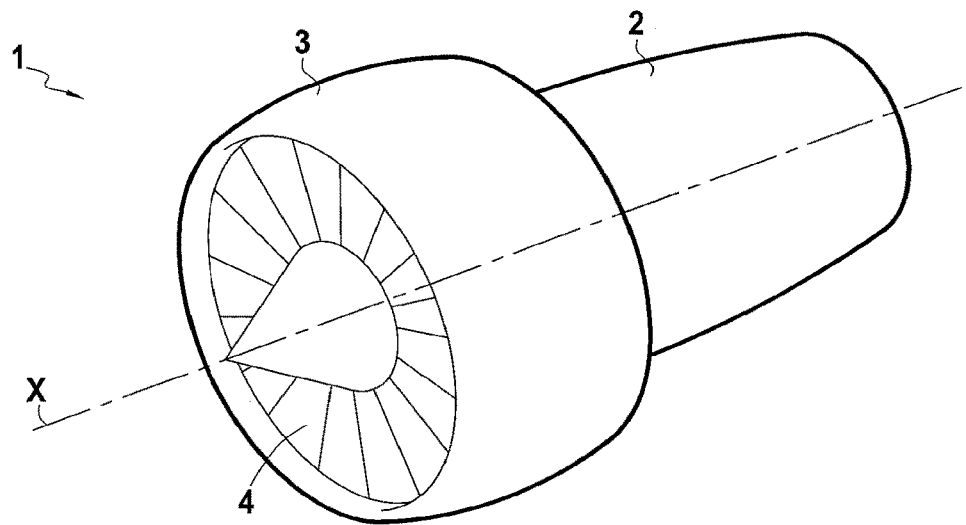
FIG.1
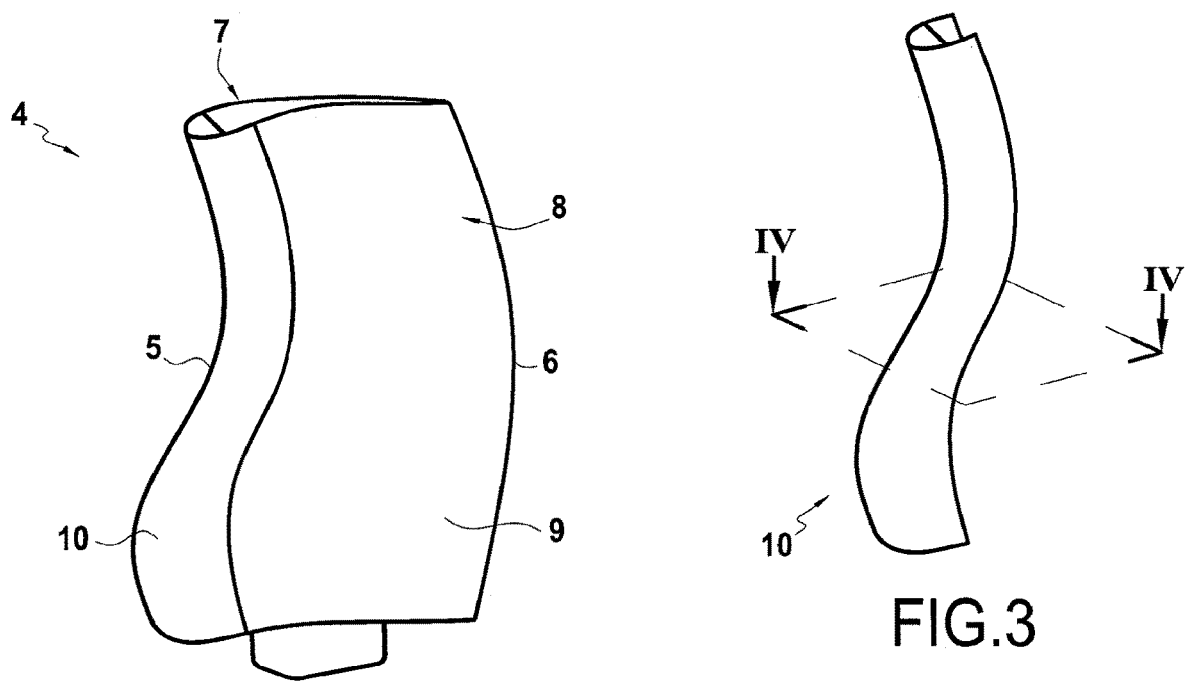
FIG.2
FIG.3

METHOD OF MANUFACTURING A LEADING EDGE SHIELD

BACKGROUND OF THE INVENTION

The present invention relates to a method of fabricating a leading edge shield. Such leading edge shields are typically for protecting the leading edges of rotary blades against impacts. In this context, the term "blades" should be understood to cover both fan blades and aerial propeller blades. In order to limit their weight, these blades are typically made of composite material comprising a polymer matrix reinforced by fibers. Although such materials present mechanical qualities that are generally very favorable, in particular relative to their weight, they are highly sensitive to point impacts, which can specifically lead to phenomena of delamination within the material. Shields, typically made of very strong metal materials such as titanium alloys, are therefore normally installed on the leading edges of such blades, in order to protect them against these impacts. Such shields are normally in the form of thin pressure side and suction side fins that are joined together by a thicker section overlying the leading edge, the shield as a whole matching the shape of the blade on its leading edge and on its adjacent pressure side and side sections. The pressure and suction side fins extend over these sections respectively on the pressure and suction sides of the blades, and they serve mainly to ensure that the shield is positioned and secured to the leading edge.

In order to improve the aerodynamic performance of blades, their leading edges present shapes that are ever more complex, thereby complicating the fabrication of shields that need to match these shapes. Two methods are presently known to the person skilled in the art. In a first of those methods, the shield is fabricated mainly by forging starting from a bar of alloy, with successive steps of cambering, filling, and extrusion, and with a final twisting step in order to move the fins towards each other and calibrate the thickest section. Applying that first method of the prior art to materials that are as strong as the titanium alloys typically used for leading edge shields nevertheless presents major drawbacks: a high level of wear for forging tools and a large number of fabrication steps, which is economically unfavorable, and great difficulty in obtaining very small thicknesses for the fins or small transition radii between the fins and the thicker section, which is technically inconvenient.

In another prior art method, the shield is made from sheets that have been machined in order to form thicker regions prior to shaping the shield. Nevertheless, that prior machining presents the drawbacks of wasting a large amount of expensive material, and also of subjecting the machining tools to wear and of requiring a long time for machining.

OBJECT AND SUMMARY OF THE INVENTION

The present invention seeks to remedy those drawbacks. In particular, the present disclosure seeks to propose a method that makes fabricating leading edge shields less expensive.

In at least one implementation, this method of fabricating a leading edge shield comprises performing initial plastic deformation on at least one sheet from a pressure side sheet and a suction side sheet, adding a reinforcement to at least one of said pressure and suction side sheets, closing said pressure and suction side sheets around a core after said initial plastic deformation and after adding the reinforcement, performing subsequent plastic deformation by pressing said pressure and suction side sheets against an outside surface of the core after the sheets have been closed around the core, and extracting the core.

In particular because of the step of adding a reinforcement to at least one of said pressure and suction side sheets, it become possible to fabricate a leading edge shield with fins that are thin and with radii of curvature between the fins and a thicker central section connecting them together that are small, while avoiding much of the machining of the material forming the shield, and thus avoiding this fabrication cost.

Said reinforcement may be formed directly on the pressure and/or suction side sheets by an additive fabrication method, e.g. such as selective melting by laser or by electron beam or deposition by plasma or by electron beam. Performing additive fabrication of the reinforcement directly on the sheet makes it possible completely or almost completely to avoid machining the reinforcement, while ensuring tight fabrication tolerances and strong bonding between the reinforcement and the sheet. Since the reinforcement is added before closing said pressure and suction side sheets around a core, it can be performed on the inside surfaces of the sheets, i.e. the surfaces that are to face the core. Thus, the surface roughness of the reinforcement that results from it being made by additive fabrication has no effect on the quality of the outside surfaces of the shield.

Said reinforcement may be added before the initial plastic deformation of the pressure and/or suction side sheets, in particular when the reinforcement is added by additive fabrication, the sheet and the reinforcement then forming a single-piece unit that can be deformed without moving the reinforcement. Nevertheless, in the alternative, said reinforcement may be added after the initial plastic deformation of the pressure and/or suction side sheets, in particular when the reinforcement is preformed prior to being added to the sheet. The three-dimensional shape of the sheet after its initial plastic deformation thus facilitates accurate positioning of the preformed reinforcement thereon.

The initial plastic deformation of the pressure and/or suction side sheets may in particular be performed by stamping. This method of hot plastic deformation makes it possible to obtain three-dimensional shapes that are complex even when starting from sheets that are particularly rigid, and also to obtain physical properties that are particularly advantageous for the parts, in particular great fatigue strength for parts made out of metal alloy.

Closing said pressure and suction side sheets around a core may in particular comprise a step of welding together the peripheries of said pressure and suction side sheets around the core. This welding of the peripheries serves firstly to provide at least initial bonding between the two sheets, and secondly it can also serve to seal a cavity between the two sheets that contains the core. This sealing can be particularly useful during the subsequent plastic deformation of the sheets.

Said subsequent plastic deformation may in particular be performed by hot isostatic pressing (also known by the abbreviation HIP). Like stamping, hot isostatic pressing makes it possible to obtain shapes that are complex even with materials that are very rigid, with this method enabling the two sheets to be fitted very closely to the shapes of the core. Simultaneously, hot isostatic pressing makes it possible to consolidate the bonding between the pressure side sheet, the suction side sheet, and the reinforcement, and also to decrease the porosity and to increase the density of each of these components, and in particular of the reinforcement when it is produced by additive fabrication. Advantageously, the above-mentioned welding of the peripheries presents the advantage of eliminating any risk of the inside surfaces becoming oxidized by maintaining the cavity under a vacuum during the HIP treatment.

The fabrication method may also include at least one step of machining the pressure and suction side sheets after said subsequent plastic deformation, in order to finish the shield and/or to enable the core to be extracted.

In addition, an insert of ceramic matrix composite material may be placed in a recess of said reinforcement prior to closing said suction and pressure side sheets around a core. This insert serves to increase the rigidity of the shield against front impacts and against centrifugal forces on the leading edge of the blade.

Furthermore, the pressure side sheet, the suction side sheet, and/or the reinforcement are made at least mainly out of titanium, which material provides physical properties that are particularly advantageous for this application. The term "at least mainly out of titanium" should be understood as meaning that the material of each of these components may in particular be a titanium-based alloy.

The present disclosure also relates to a leading edge shield made by the method, a blade comprising a body made of composite material and such a leading edge shield, and a turbofan including an optionally ducted fan having a plurality of such blades.

BRIEF DESCRIPTION OF THE DRAWINGS

The invention can be well understood and its advantages appear better on reading the following detailed description of two embodiments given as non-limiting examples. The description refers to the accompanying drawings, in which:

FIG. 1 is a diagrammatic perspective view of a turbofan;

FIG. 2 is a diagrammatic perspective view of a rotary blade of the fan of the FIG. 1 turbofan;

FIG. 3 is a diagrammatic perspective view of a leading edge shield for the FIG. 2 blade;

DETAILED DESCRIPTION OF THE INVENTION

Figure 4:
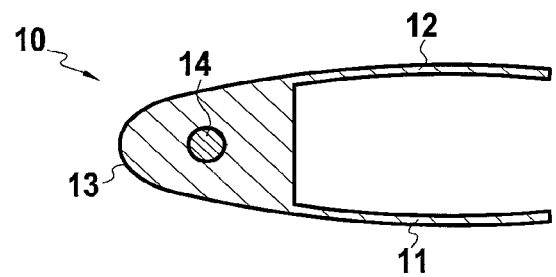
FIG. 4 is a cross-section view on plane IV-IV showing the shield of FIG. 3.

FIG. 1 shows a bypass turbojet 1 comprising a gas generator core 2 and a fan 3. The fan 3 has a plurality of rotary blades 4 arranged radially around a central axis X and aerodynamically profiled so as to impel air by rotating. Thus, as shown in FIG. 2, each blade 4 has a leading edge 5, a trailing edge 6, a suction side 7, and a pressure side 8.

In normal operation, the relative wind is oriented substantially towards the leading edge 5 of each blade 4. Thus, the leading edge 5 is particularly exposed to impacts. In particular when the blade 4 has a body 9 made of composite material, in particular having a polymer matrix reinforced by fibers, it is thus appropriate to protect the leading edge 5 with a shield 10 integrated in each blade.

FIGS. 3 and 4 show the shield 10, which presents a pressure side fin 11, a suction side fin 12, and a thicker central section 13 for overlying the leading edge of the blade 4 and interconnecting the pressure side and section side fins 11 and 12. The pressure side and suction side fins 11 and 12 position the shield 10 on the blade 4. The shield as a whole may be made mainly out of metal, and more specifically out of a titanium-based alloy, such as TA6V (Ti-6Al-4V) for example. Nevertheless, other materials, mostly metals, such as aluminum and its alloys or nickel-chromium-based alloys of the Inconel® type may be used as alternatives or in addition to alloys based on titanium. Furthermore, as in the example shown, the central section 13 may include a longitudinal insert 14 made of ceramic matrix composite material embedded in the mass of the central section. By way of example, the insert 14 may comprise ceramic fibers coated in titanium or titanium alloy and extending longitudinally in the direction of the rotary force.

As can be seen in FIGS. 3 and 4, the shape of the shield 10 can be quite complex, and in combination with the high-performance materials that are typically used for this part, this can make it expensive and difficult to fabricate.

A method of fabrication that enables this problem to be solved is shown in FIGS. 5A to 5H. In a first step of this method, shown in FIG. 5A, an additive fabrication method is used to add reinforcements 15 and 16 on a pressure side sheet 17 and a suction side sheet 18, respectively. These sheets 17 and 18 may be made of metal and more specifically out of a titanium-based alloy, such as TA6V, for example. Among the additive fabrication methods that are suitable for use in this first step, there are included in particular selective melting by laser or electron beam and deposition by plasma or by electron beam. Each of these methods is suitable for additive fabrication of metal reinforcements 15, 16 attached to the surface of the sheet 17, 18. The material of the reinforcements may also be selected from the above-mentioned metal materials, and in particular it may be the same as the material of the sheet 17, 18 on which the corresponding reinforcement 15, 16 is attached.

Figure 5A:
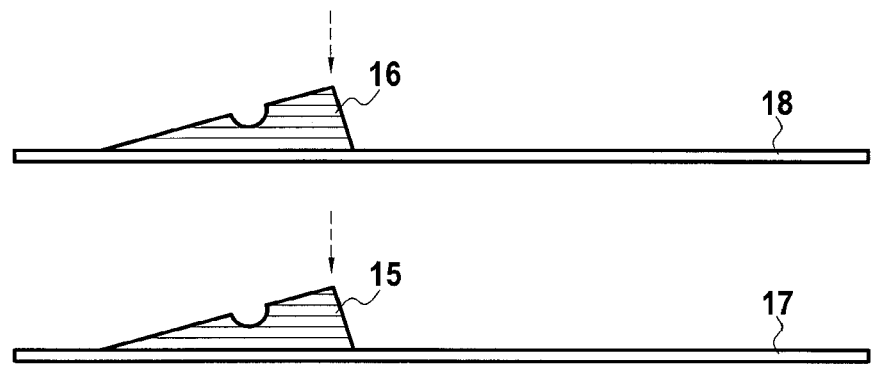
FIGS. 5A to 5H show successive steps in a first method of fabricating the FIG. 4 shield.
Figure 5B:
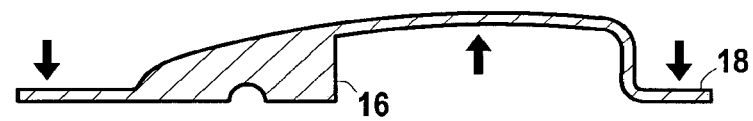
Figure 5B:
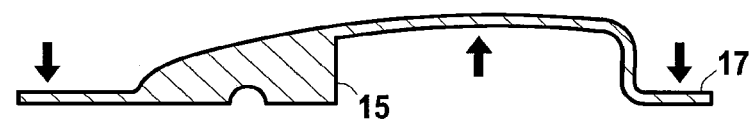

In a second step, shown in FIG. 5B, the sheets 17 and 18 are subjected to initial plastic deformation. This initial plastic deformation may be performed in particular while hot by stamping, after heating each sheet to a temperature Tm, which, by way of example, may lie in the range 400° C. to 600° C. for aluminum and aluminum-based alloys, in the range 800° C. to 1000° C. for titanium and titanium-based alloys, and in the range 850° C. to 1050° C. for nickel-chromium-based alloys.

Figure 5C:
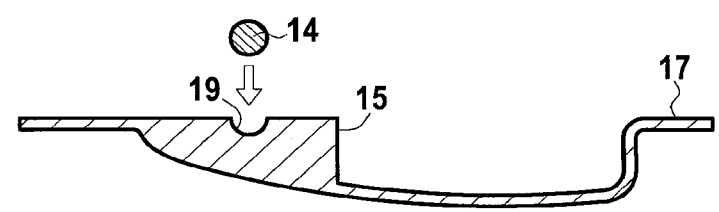
Figure 5D:
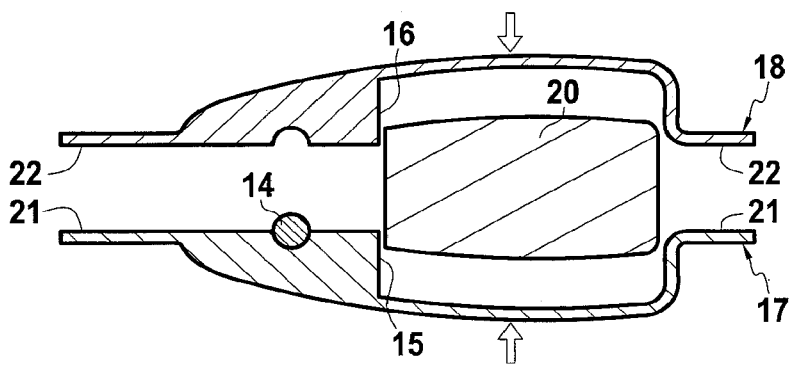

In a third step, as shown in FIG. 5C, the fiber longitudinal insert 14 is placed in a recess 19 formed in one of the reinforcements 15, 16. Thereafter, in a fourth step, shown in FIG. 5D, the sheets 17 and 18 together with the reinforcements 15, 16 and the insert 14 are closed around a core 20. Thus, the concave walls of the sheets 17 and 18 as formed during their initial plastic deformation form a cavity receiving the core 20, while a periphery 21 of the pressure side sheet 17 contacts a periphery 22 of the suction side sheet 18 all around the core 20 together with the reinforcements 15, 16 and the insert 14. The core 20 may in particular be made of a material that is substantially more refractory than the sheets 17 and 18 and the reinforcements 15, 16, and in particular out of nickel or of nickel alloy. In order to avoid the sheets 17, 18 and the reinforcements 15, 16 adhering to the core 20, the core may previously be subjected to surface treatment, e.g. oxidation at a temperature To of 900° C., for example, for a period $t_o$ of at least two hours.

In a variant not shown, a plurality of recesses may be provided in the join plane of the reinforcements with a corresponding number of fiber inserts being placed therein.

Figure 5E:
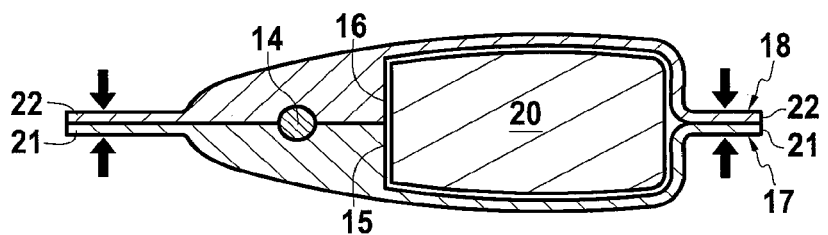

In a fifth step, shown in FIG. 5E, the peripheries 21 and 22 of the sheets 17 and 18 are welded together all around the core 20, thereby hermetically sealing the cavity in which the core 20 is received. This welding may be performed in particular by an electron beam under a vacuum, although other welding methods may also be envisaged depending on the materials and the shapes involved.

Figure 5F:
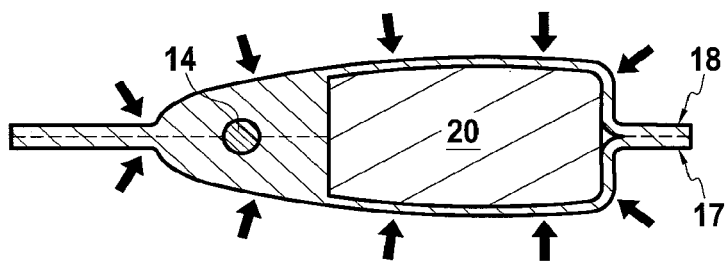

In a sixth step, shown in FIG. 5F, the sheets 17, 18 and the reinforcements 15, 16 are subjected to hot isostatic pressing (HIP) against the outside surface of the core 20, thereby in particular imparting subsequent plastic deformation to the sheets 17 and 18, and also consolidating the assembly formed by the sheets 17 and 18 and the reinforcements 15, 16. In addition, this hot isostatic pressing serves to increase the density of the reinforcements 15, 16, thereby improving their mechanical properties. The hot isostatic pressing may be performed at a pressure ph of about 100 megapascals (MPa), for example, and at a temperature Th that may lie in the range 850° C. to 950° C. for titanium alloys, for example.

Figure 5G:
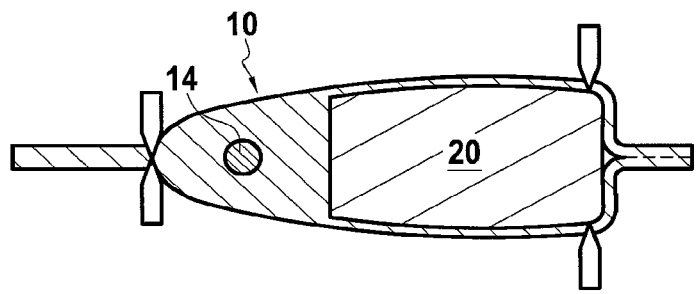
Figure 5H:
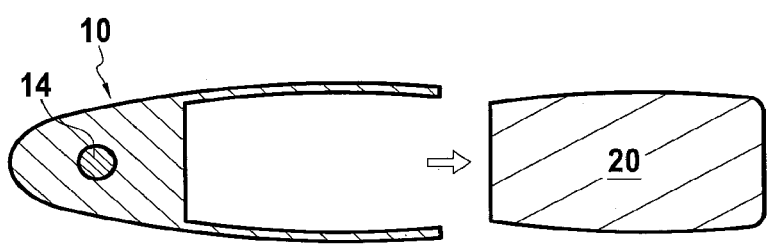

After this sixth step, it is possible to perform a seventh step, shown in FIG. 5G, in which the sheets 17 and 18 are machined so as to enable the core 20 to be extracted and also so as to finish the shield 10, in particular by eliminating the peripheries 21 and 22 from the sheets 17 and 18. After extracting the core 20 as shown in FIG. 5H, this produces the shield 10 in its final shape. Nevertheless, although the machining and the extraction of the core 20 are shown in this example as steps that are consecutive, it is also possible to envisage performing some of the machining, in particular for finishing the shield 10, after the core 20 has been extracted. Among the machining methods that can be envisaged, mention may be made in particular of milling.

Although the present invention is described with reference to a specific implementation, it is clear that various modifications and changes may be made to these implementations without going beyond the general scope of the invention as defined by the claims. In particular, it is possible to envisage using methods of plastic deformation other than stamping and hot isostatic pressing. Furthermore, and in particular if a method other than hot isostatic pressing is used for the subsequent plastic deformation of the sheets after they have been closed around the core, it is possible to envisage omitting the step of welding together the peripheries of the sheets around the core.

In addition, although in both methods illustrated, each sheet receives a corresponding reinforcement and is subjected to initial plastic deformation, it is also possible to envisage using a single reinforcement added to only one of the sheets, and/or to subject only one of the sheets to initial plastic deformation. For example, both sheets may be subjected to initial plastic deformation while only one of them receives reinforcement. Alternatively, one of the pressure or suction sides of the shield may be formed by initial plastic deformation and adding a reinforcement, while the other is formed by a conventional method such as machining. Thus, a reinforcement may be added to one of the sheets by additive fabrication, while another reinforcement is preformed prior to being applied to the other sheets. Consequently, the description and the drawings should be considered in a sense that is illustrative rather than restrictive.

The invention claimed is:

1. A fabrication method for fabricating a leading edge shield, the fabrication method comprising:
    adding a reinforcement that is created directly on at least one sheet from among a pressure side sheet and a suction side sheet by additive fabrication, before performing initial plastic deformation on the at least one sheet from among the pressure side sheet and the suction side sheet;
    closing said pressure and suction side sheets around a core, after said initial plastic deformation and after adding the reinforcement;
    performing subsequent plastic deformation by pressing said pressure and suction side sheets against an outside surface of a core, after the sheets have been closed around the core; and
    extracting the core.

2. The fabrication method according to claim 1, wherein initial plastic deformation is performed on the at least one sheet from among the pressure side sheet and the suction side sheet by stamping.

3. The fabrication method according to claim 1, wherein closing said pressure and suction side sheets around a core comprises a step of welding together the peripheries of said pressure and suction side sheets around the core.

4. The fabrication method according to claim 3, wherein the step of welding together the peripheries of said pressure and suction side sheets around the core is performed by electron beam welding.

5. The fabrication method according to claim 1, wherein said subsequent plastic deformation is performed by hot isostatic pressing.

6. The fabrication method according to claim 1, including at least one step of machining the pressure and suction side sheets after said subsequent plastic deformation.

7. The fabrication method according to claim 1, wherein an insert of ceramic matrix composite material is placed in a recess of said reinforcement prior to closing said suction and pressure side sheets around the core.

8. The fabrication method according to claim 1, wherein at least one of the pressure side sheet, the suction side sheet, and the reinforcement comprises titanium.

9. A fabrication method for fabricating a leading edge shield, the fabrication method comprising:
    performing initial plastic deformation on at least one sheet from among a pressure side sheet and a suction side sheet, before adding a reinforcement that is created directly on the at least one sheet from among the pressure side sheet and the suction side sheet by additive fabrication;
    closing said pressure and suction side sheets around a core, after said initial plastic deformation and after adding the reinforcement;
    performing subsequent plastic deformation by pressing said pressure and suction side sheets against an outside surface of a core, after the sheets have been closed around the core; and
    extracting the core.

10. The fabrication method according to claim 9, wherein initial plastic deformation is performed on the at least one sheet from among the pressure side sheet and the suction side sheet by stamping.

11. The fabrication method according to claim 9, wherein closing said pressure and suction side sheets around a core comprises a step of welding together the peripheries of said pressure and suction side sheets around the core.

12. The fabrication method according to claim 11, wherein the step of welding together the peripheries of said pressure and suction side sheets around the core is performed by electron beam welding.

13. The fabrication method according to claim 9, wherein said subsequent plastic deformation is performed by hot isostatic pressing.

14. The fabrication method according to claim 9, including at least one step of machining the pressure and suction side sheets after said subsequent plastic deformation.

15. The fabrication method according to claim 9, wherein an insert of ceramic matrix composite material is placed in a recess of said reinforcement prior to closing said suction and pressure side sheets around the core.

16. The fabrication method according to claim 9, wherein at least one of the pressure side sheet, the suction side sheet, and the reinforcement comprises titanium.

* * * * *